United States Patent Office 2,708,325
Patented May 17, 1955

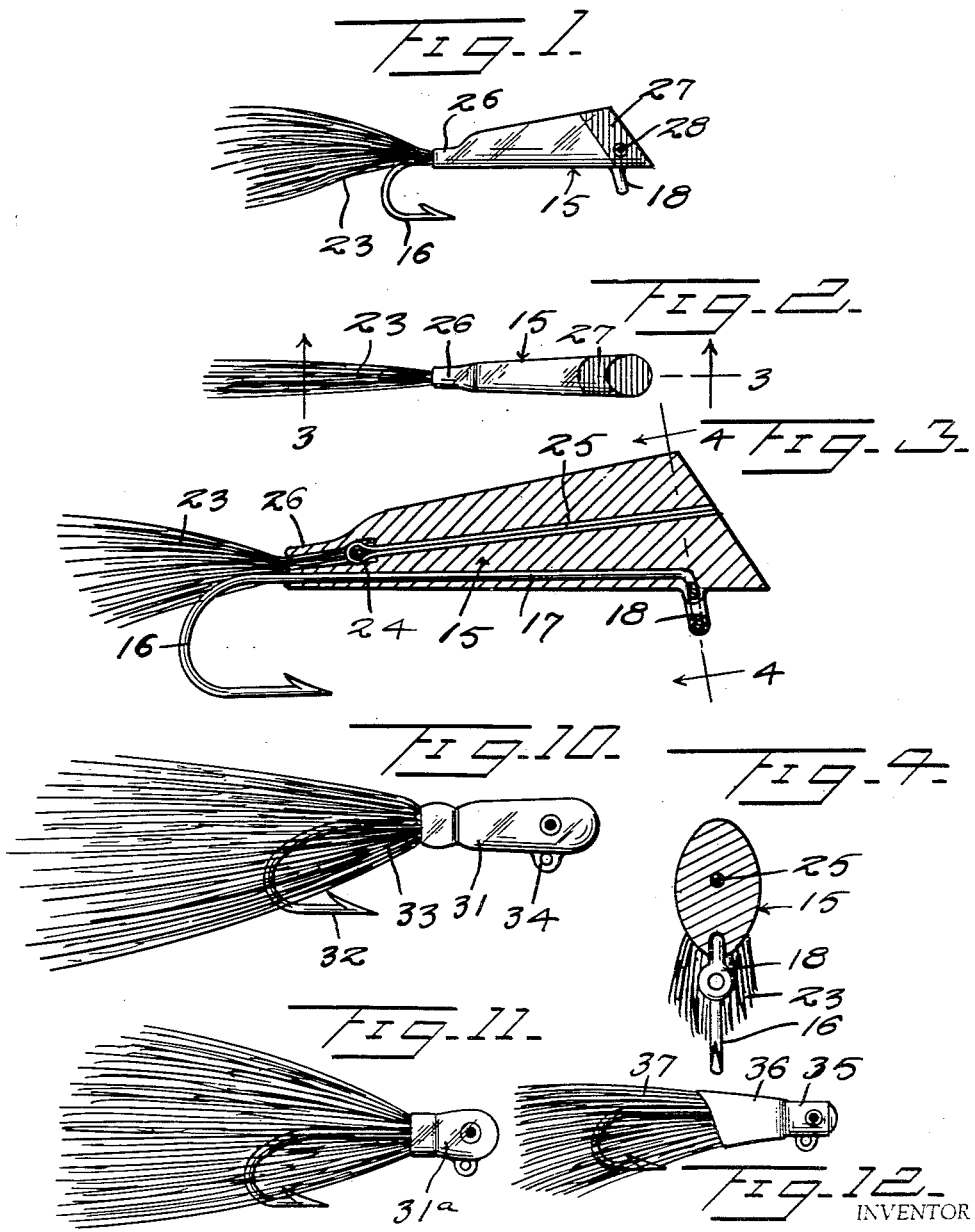

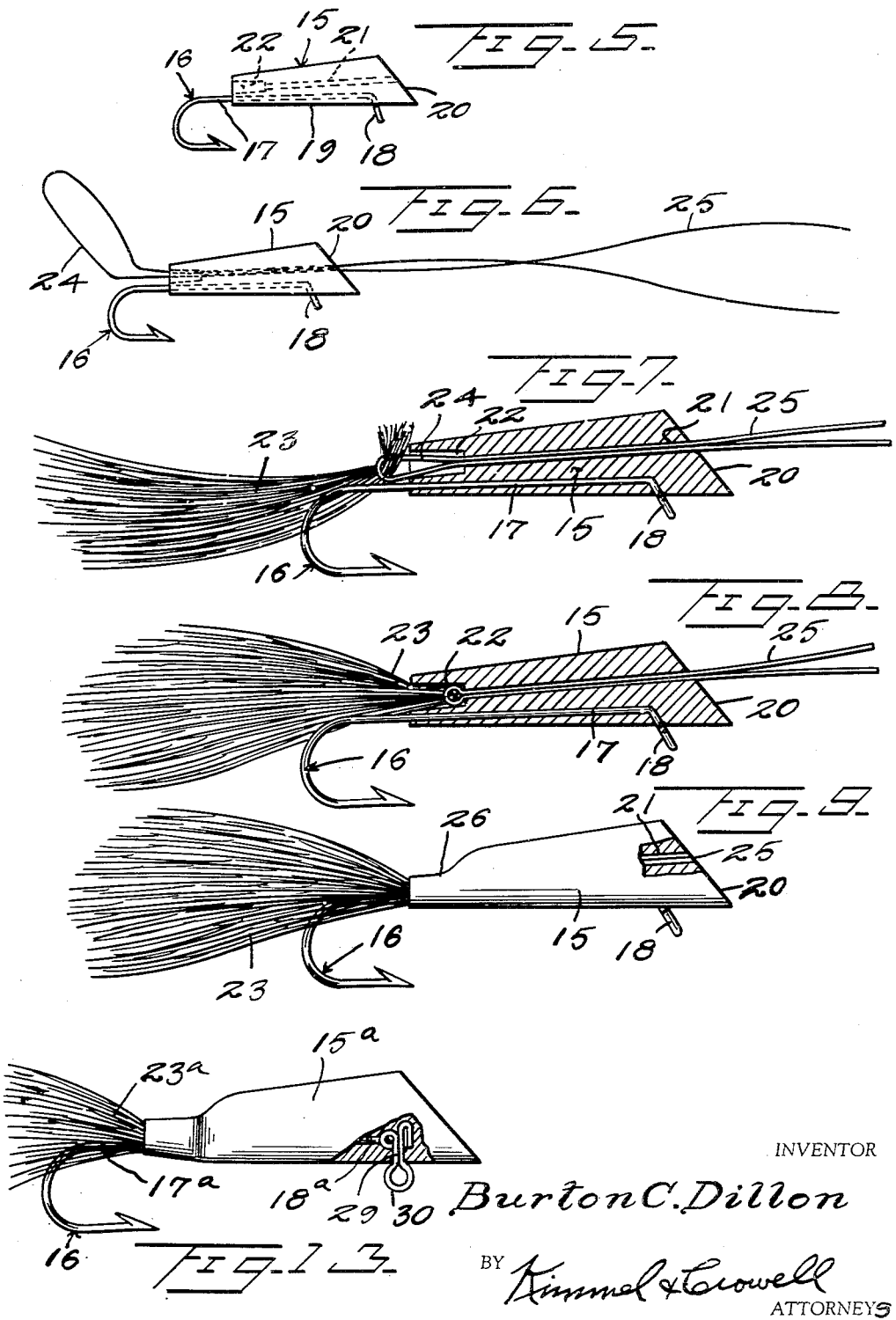

2,708,325

FISH LURE

Burton C. Dillon, Baltimore, Md.

Application April 9, 1951, Serial No. 220,104

2 Claims. (Cl. 43—42.28)

This invention relates to fish lures and an improved method of making the same.

An object of this invention is to provide an improved fish lure and more particularly to an improved means of securing hair, strand material or feathers within the body of the lure to form a hackle.

Another object of this invention is to provide an improved fish lure having a weighted body with hair or like material projecting from the rear of the body, the hair being firmly clamped in the body by means of constricting the body.

A further object of this invention is to provide an improved fish lure having a hook partially embedded in the body with hair or like material projecting from the rear of the body and an improved means for securing the hair in the body.

A further object of this invention is to provide a lure having a weighted and tapered body with a hook secured in the body and hair or like strand material projecting from the rear of the body, and the body is partially or completely covered by a coating such as a plastic coating, paint or metal plating.

With the above and other objects in view, my invention consists in the arrangement, combination and details of construction disclosed in the drawings and specification, and then more particularly pointed out in the appended claims.

In the drawings:

Figure 1 is a detailed side elevation of a fish lure constructed according to this invention.

Figure 2 is a plan view of the lure.

Figure 3 is a sectional view taken on the line 3—3 of Figure 2.

Figure 4 is a sectional view taken on the line 4—4 of Figure 3.

Figure 5 is a detailed side elevation of the lure body with the hook member inserted therein.

Figure 6 is a detailed side elevation showing a reverted wire clamp partially inserted in the lure body.

Figure 7 is a longitudinal section illustrating the position of the loop formed in the reverted wire just prior to its seating in the recess to firmly clamp the hair strands therein.

Figure 8 is a longitudinal section showing the complete assembly of the lure.

Figure 9 is a detailed side elevation partly broken away and in section showing the final step in making the lure prior to coating the same.

Figure 10 is a detailed side elevation of another form of this lure.

Figure 11 is a detailed side elevation of a further form of this lure.

Figure 12 is a detailed side elevation of another form of this lure.

Figure 13 is a detailed side elevation partly broken away and in section showing a further modification of this invention.

Referring to the drawings and, first, to Figures 1 to 9, inclusive, the numeral 15 designates generally an elongated tapering body which is formed from lead or other weighted material, plastic or plastic like material.

The body 15 as shown in Figure 4 is of substantially elliptical configuration in transverse section and has the larger end thereof foremost and the smaller end thereof at the rear. A barbed hook 16 is cast with the body 15 having the shank 17 thereof embedded in the body 15 closely adjacent one longitudinal edge of the body, and the eye 18 carried by the shank 17 is bent on a substantial obtuse angle and projects outwardly from the narrow edge of the body 15.

The front end of the body 15 is disposed on an acute angle to the lower edge 19 as indicated at 20 so that the lure will assume an irregular movement through the water. In forming the body 15 a relatively small diameter bore 21 is formed in the body 15 extending from the front end 20, and the bore 21 communicates with a larger bore or socket 22 formed in the rear end of the body 15. The socket 22 has mounted therein reverted hairs 23 or other stranded material and, preferably, the hairs 23 are extended through a loop or eye 24 which is formed by extending a reverted wire or thread-like material 25 through the bore or socket 22 and the bore 21.

The loop or eye 24 is adapted to be pulled forwardly into the socket 22, and as the loop 24 is pulled into the socket 22 the doubled hair or strand material 23 will also be drawn into and will be compressed in doubled form within the socket 22 and extend therefrom to form a hackle. The projecting ends of the wire or thread 25 which project beyond the forward end 20 are then adapted to be cut off as shown in Figure 9 so that the ends of the wire or threads 25 will be flush with the forward end 20. After the hair or strands 23 have been drawn into the socket 22 the rear end of the body 15 is constricted as indicated at 26 so as to thereby tightly bind the hair or strands 23 within the socket 22. Constriction of the rear end of body 15 makes socket 22 smaller and the doubled back hair is swedged so it will not pull out through smaller area of constricted socket.

The body 15 after having the hair 23 drawn into the rear end thereof is then painted or coated as indicated at 27, and eyes 28 may also be painted or otherwise formed on the forward end of the body 15.

Referring now to Figure 13, there is disclosed another modified form of this invention including a body 15a which is substantially identical with the body 15 and which has hair or stranded material 23a secured within the rear end thereof.

The shank 17a of the hook 16 extends longitudinally within the body 15a being embedded within the cast material forming the body 15a, and the eye 18a of the shank 17a has secured thereto a clip 29 which is formed with an eye 30 projecting outwardly of the lower or narrow edge of the body 15a.

The construction shown in Figure 13 is designed for use with lures which are substantially heavier than the lures shown in Figures 1 to 9, inclusive.

The lure shown in Figure 10 is formed substantially similar with the lure shown in Figures 1 to 9, inclusive, and includes a tapered body 31 having a barbed hook 32 projecting from the rear end thereof and with the shank 33 embedded within the body 31. An eye 34 projects from the lower side of the body 31 so that a fish line may be connected with the lure. Preferably the outer surface of the lure body 31 is covered with a plastic, paint, plating or waterproof coating designed to simulate a minnow.

The lure shown in Figure 11 is similar to that shown in Figure 10 with the exception that the body 31a is substantially shorter in length than the body 31 shown in Figure 10.

The lure shown in Figure 12 is similar to that shown in Figures 10 and 11 with the exception that the body 35 is substantially shorter in length than the body 31 or the body 31a. The outer surface of the body 31 is covered with a plastic coating and a plastic skirt or shield 36 projects rearwardly from the body 35 and encompasses the forward ends of the hair 37 which is secured to and projects from the rear end of the body 35.

In the making of the lure the hook 16 has the shank 17 embedded therein and the wire 25 is bent upon itself to form the loop 24, and the ends of the wire 25 are then extended through the socket 22 and through the bore 21 until the wire ends project from the forward end of the body 15. The hair 23 is then extended through the initially large loop 24, and then wire 25 is then pulled forwardly so that the loop 24 will gradually be constricted and reduced in size by contact with the walls of the socket 22. When the wire has been drawn into the body 15 to the limit shown in Figure 8 the loop or elye 24 will tightly bind about the hair or strands 23.

The rear end of the body 15 about the socket 22 is then constricted by suitable pressure or clamping means so as to firmly and tightly clamp the looped or reverted hair 23 within the socket 22 and prevent the loop or eye 24 from moving rearwardly and outwardly of the socket 22.

Each of the lures of the several modifications is constructed with the strands of material drawn into a socket by a double wire passed through an opening in the body of the lure and with the walls of the socket crimped in upon the strands of the material to clamp the material in the socket.

It will be understood that the term "weighted body" as used herein is defined as a body formed out of lead, or other metal, plastic or buoyant material.

What is claimed is:

1. A fish lure comprising an elongated body tapering convergently from its front end to its rear end and having an elliptical transverse cross-section, said body having a flat forward face at its front end contained in a plane inclined rearwardly at an acute angle with respect to the longitudinal axis of said body, a barbed hook having the shank thereof embedded in said body longitudinally thereof with the eye of said hook being transverse to said shank and extending exteriorly of said body rearwardly of said forward face, and with the bight of said hook extending rearwardly of said body, said body having a socket extending inwardly from its rear end and adjacent to but spaced from said hook, said body having a longitudinally extending bore extending from said socket and opening in the plane of said flat forward face, a doubled wire extending through said bore and having a looped end in said socket, strand material passing through said looped end in said socket and having end portions extending rearwardly out of said socket to form a trailing hackle, said body being constricted about the rear walls of said socket to clamp said hackle in overlying relation with the bight of said hook, said longitudinally extending bore having the axis thereof contained in a plane also containing the longitudinal axis of said shank.

2. A fish lure comprising an elongated body tapering from its front end to its rear end and having an elliptical transverse cross-section, said body having a forward face at its front end, a barbed hook having the shank thereof embedded in said body longitudinally thereof, means forming an eye attached to the shank of said hook and extending exteriorly of said body rearwardly of said forward face, with the bight of said hook extending rearwardly of said body, said body having a socket extending inwardly from its rear end adjacent to but spaced from said hook, said body having a longitudinally extending bore extending from said socket and opening through said forward face, a doubled wire extending through said bore and having a looped end in said socket, strand material passing through said looped end in said socket and having end portions extending rearwardly out of said socket to form a trailing hackle, said body being constricted about the rear walls of said socket to clamp said hackle in overlying relation with the bight of said hook, said longitudinally extending bore having the longitudinal axis thereof contained in a plane also containing the longitudinal axis of said shank.

References Cited in the file of this patent

UNITED STATES PATENTS

| Number | Name | Date |
|---|---|---|
| 1,049,341 | Chandler | Jan. 7, 1913 |
| 1,435,177 | Peckinpaugh | Nov. 14, 1922 |
| 1,497,019 | Hennings | June 10, 1924 |
| 1,801,940 | Stanley | Apr. 21, 1931 |
| 2,036,954 | Murray | Apr. 7, 1936 |
| 2,148,784 | Stewart et al. | Feb. 28, 1939 |
| 2,167,945 | Gilliam | Aug. 1, 1939 |
| 2,199,001 | Khoenle | Apr. 30, 1940 |
| 2,278,876 | Hart | Apr. 7, 1942 |
| 2,308,674 | Cave | Jan. 19, 1943 |
| 2,333,484 | Miles | Nov. 2, 1943 |
| 2,496,927 | Witte | Feb. 7, 1950 |
| 2,518,487 | Metz | Aug. 15, 1950 |
| 2,533,523 | Sivey et al. | Dec. 12, 1950 |
| 2,544,265 | Kelly | Mar. 6, 1951 |